Sept. 2, 1958     D. K. BURGETT ET AL     2,849,877
APPARATUS FOR FATIGUE TESTING OF ELASTOMERS
Filed Oct. 14, 1955                             3 Sheets-Sheet 3
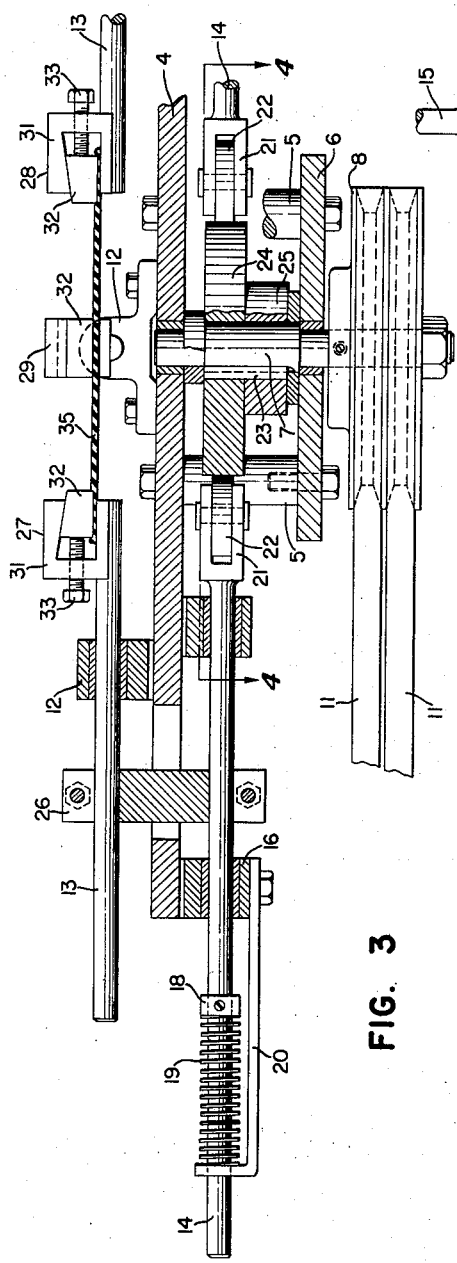
INVENTOR.
SAMUEL D. GEHMAN
DONALD K. BURGETT
RICHARD P. CLIFFORD
BY
ATTORNEY

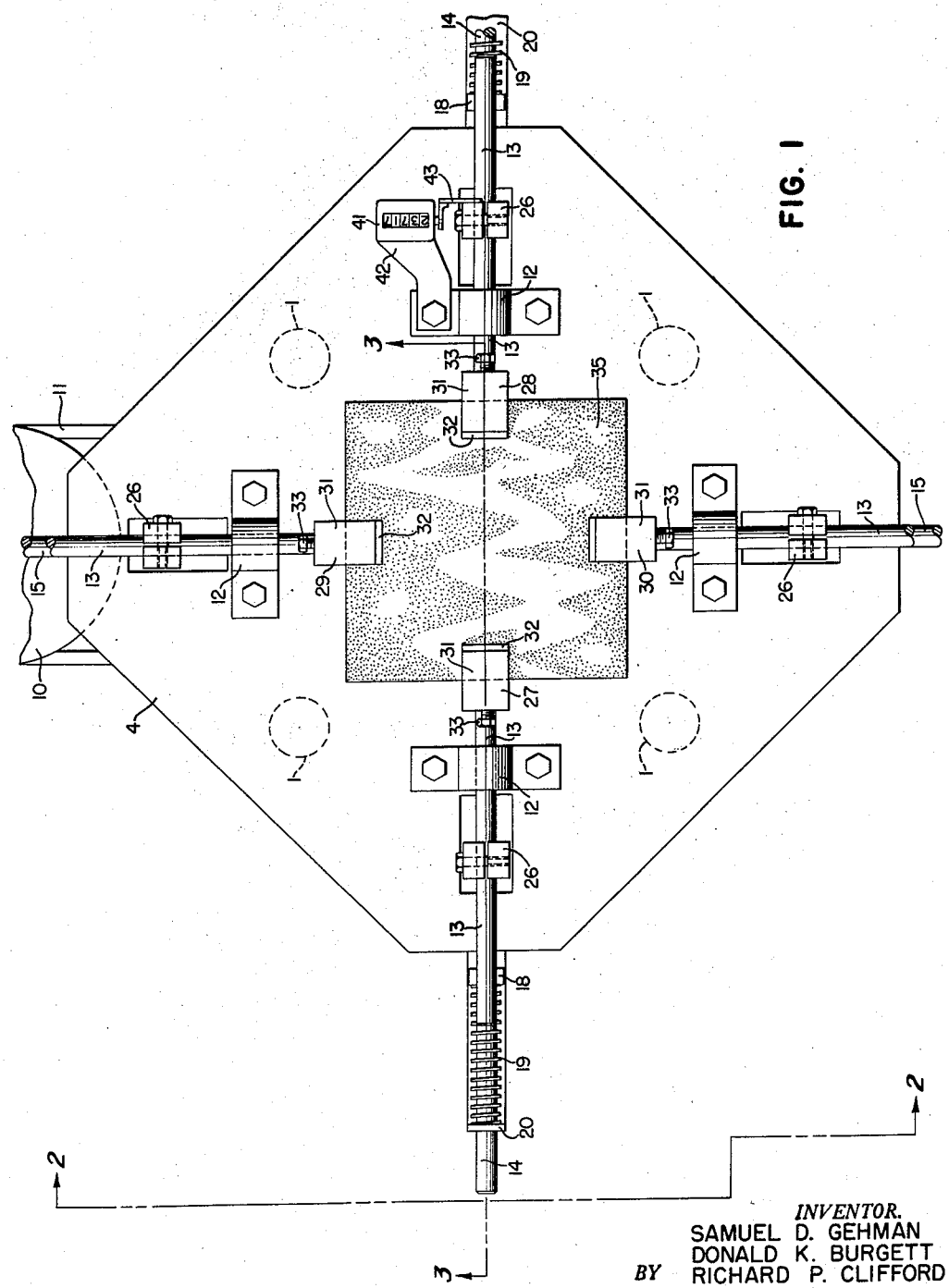

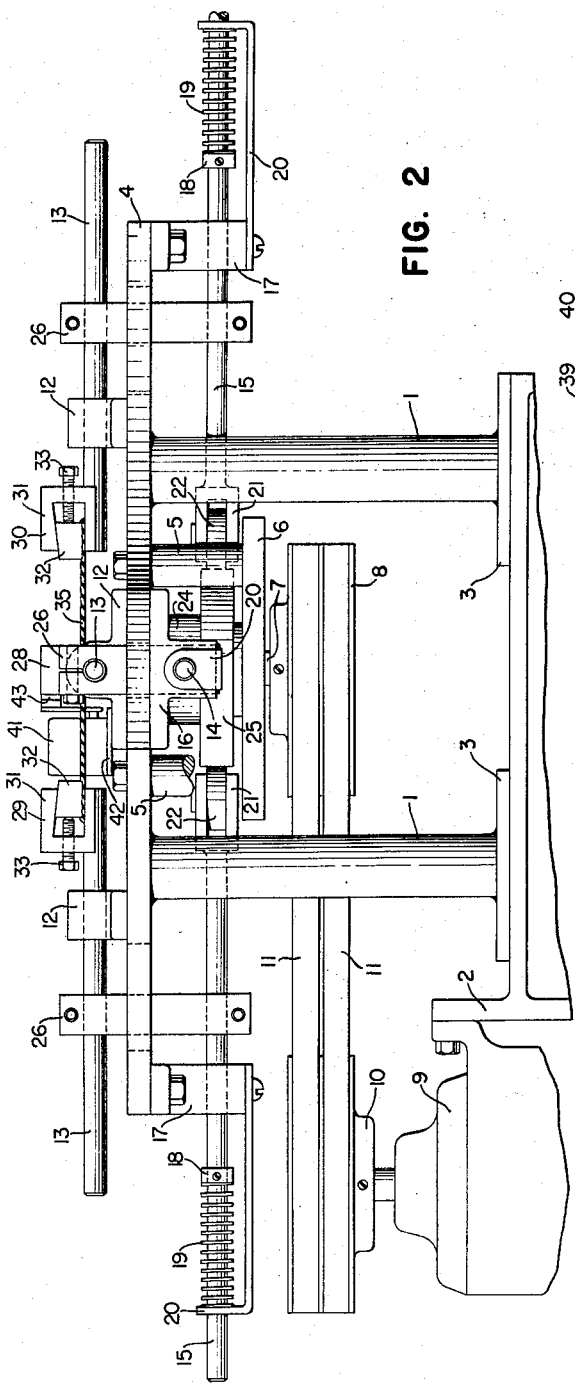

2,849,877

APPARATUS FOR FATIGUE TESTING OF ELASTOMERS

Donald K. Burgett, Tallmadge, Ohio, Richard P. Clifford, Reseda, Calif., and Samuel D. Gehman, Akron, Ohio, assignors to The Goodyear Tire & Rubber Company, Akron, Ohio, a corporation of Ohio Application October 14, 1955, Serial No. 540,422

3 Claims. (Cl. 73—88)

This invention relates generally to apparatus for fatigue testing of elastomers and more particularly to apparatus for effecting biaxial and multiaxial stresses within a sheet specimen of an elastomer.

The general object of the invention is to provide apparatus to cyclically stress a sheet specimen of an elastomer along at least two axes in the plane thereof.

A further object of the invention is to provide apparatus for fatigue testing having means for varying the phase relationships between the individual axes of stress.

Other objects and advantages of this invention will become apparent hereinafter as the description thereof proceeds; the novel features, arrangements, and combinations being clearly delineated in the specification, as well as in the claims thereunto appended.

In the drawings.

Fig. 1 is a plan view of the apparatus of the invention;

Fig. 2 is an elevation of the apparatus of the invention taken along line 2—2 of Fig. 1;

Fig. 3 is a cross-sectional view of the apparatus of the invention taken along the line 3—3 of Fig. 1;

Fig. 4 is a fragmentary view of the apparatus of the invention taken along the line 4—4 of Fig. 3;

Fig. 5 is a fragmentary view similar to that of Fig. 4;

Fig. 6 is a graph illustrating the phase relationship for biaxially induced stresses in phase;

Fig. 7 is a graph similar to that of Fig. 6 but with the stresses 180 degrees out of phase; and Fig. 8 is a graph similar to that of Fig. 6 but with the stresses 90 degrees out of phase.

Referring to Figs. 1, 2 and 3, four supporting posts 1 are mounted on a base plate 2 by base pads 3. A flat table 4 is mounted on the posts 1 and has suspended therebelow in a central position by spacers 5 a support plate 6. Supported between the plate 6 and the table 4 and suitably journaled in both is a shaft 7 having a drive pulley 8 mounted on an end thereof projecting from the undeside of the plate 6. The pulley 8 is driven by a motor 9 through a motor pulley 10 and V-belts 11. The motor 9 is mounted on an integral flange portion of the base plate 2.

Symmetrically equidistant around the centerpoint of the table 4 are mounted four journal blocks 12, each having a long rod 13 passing therethrough, with the rods 13 radially directed from the center-point of the table 4 and extending beyond the outer edge thereof. Lying below the table 4 and positioned parallel to the rods 13 are two sets of oppositely opposed rods 14 and 15 suitably journaled by individual journal blocks 16 and 17 respectively. Adjacent the outer extremities of the rods 14 and 15, a loading assembly having a stop collar 18, a spring 19, and a support bracket 20 is provided on each rod with one end of the bracket 20 affixed to the respective journal blocks 16 and 17. At each of the inner extremities of the rods 14 and 15 there is a yoke 21 having a freely rotating follower wheel 22 mounted therein. Secured to the shaft 7 by means of a key 23 are an upper cam 24 and a lower cam 25.

Referring now to Fig. 1, it will be seen that the two rods 14 are in coaxial opposed relation. Likewise the two rods 15 are also in similar relation. Fig. 3 is a cross-sectional view taken along the line 3—3 of Fig. 1. As can be best seen in Fig. 2, the rods 15, through their respective yokes 21 and follower wheels 22, bear on the lower cam 25 and in Fig. 3 the rods 14, through their respective yokes 21 and follower wheels 22, bear on the upper cam 24. Four cross-links 26 rigidly link the rods 13 with their respectively underlying rods 14 and 15. Thus the two opposed rods 15 and their respective overlying upper rods 13 follow the motion defined by the lower cam 25, while the two opposed rods 14 and their respective overlying upper rods 13 follow the motion defined by the upper cam 24.

Mounted on each of the inner extremities of the rods 13 are specimen-gripping clamps 27, 28, 29 and 30 consisting of an outer clamp body 31, a wedge 32, and an adjustment screw 33.

Fig. 4 illustrates the cam arrangement and the adjustments provided therefor. The two cams 24 and 25 each have three keyways 34 spaced on a 120 degree included angle therebetween. In view of the orientation of the keyways 34, the cams 24 and 25 can be overlaid in three phase relationships: (a) in phase, (b) 90 degrees out of phase, and (c) 180 degrees out of phase. Fig. 4 shows the cam positioning for (c) above and Fig. 5 for (a) above. Relationship (b) above can be achieved by simply removing the lower cam 25 of Fig. 5 and rotating it one keyway angularly and then replacing the cam 25 on the key 23.

In operation a rectangular section of test specimen 35 of Fig. 1 is placed with the edges thereof within the clamps 27, 28, 29 and 30 and the adjustment screws 33 rotated to move the wedge 32 into position, thus clamping the specimen 35 as shown in Fig. 1. With the cam phasing of Fig. 4 utilized for purposes of illustration, as the shaft 7 is now rotated, the rods 14 and 15 are moved radially in reciprocating manner corresponding to the circumferential outlines of their respective cams 24 and 25. The rods 13, being rigidly fastened to the rods 14 and 15, also move in identical manner. As a consequence, the clamps 27 and 28 are moved in correspondence to the curve of cam 24 and the clamps 29 and 30 to the curve of cam 25. Therefore, as inspection of Figs. 3 and 4 will make obvious, the specimen 35 is first stretched simultaneously along two axes normal to each other and then relaxed simultaneously along both axes.

Fig. 6 shows this relationship between the opposed clamps 27 and 28 and the other set of opposed clamps 29 and 30 graphically. The abscissa represents time units and the ordinate the linear displacement of the aforementioned clamps. A curve 36 shown in Fig. 6 is the result of the cam placement as shown in Fig. 4. The point A on the ordinate of Fig. 6 represents that position of the shaft 7 of Fig. 4 where the opposed rods 14, and consequently the clamps 27 and 28, are at minimum separation. The point C of Fig. 6 similarly represents the position of maximum separation of the clamps 27 and 28. It is obvious that with the cam arrangement of Fig. 4, where the clamps 27 and 28 are at maximum separation, the clamps 29 and 30 are also at maximum separation. The same is true for minimum separation. Therefore, the curve 36, shown in Fig. 6, applies to both sets of clamps. I. e., at time D, opposed clamps 27 and 28 are at maximum separation, as are also clamps 29 and 30. At time E, clamps 27 and 28 are at minimum separation, as are clamps 29 and 30. Thusly, the cam arrangement shown in Figs. 4 and 6 are referred to as being an "in phase" relationship.

As will be obvious from inspection, the specimen 35 may be inserted within the clamps 27, 28, 29 and 30 when said clamps are at some position intermediate the displacements A or C of Fig. 6. The specimen would then be under tension only part of the cycle and be in a "buckled" condition during the remainder of the cycle. The point B on the ordinate of Fig. 6 represents this point of reversal which, for reasons appropriate to the purpose of the test, may be a highly desirable feature of the apparatus.

Fig. 5 illustrates another cam arrangement with cam 24 superimposed congruently on cam 25. Fig. 7 shows the graphical result of the use of the cam arrangement of Fig. 5. Referring to Fig. 5, when the rods 14, and consequently the clamps 27 and 28, are at maximum separation, the rods 15, and consequently the clamps 29 and 30, are at minimum separation, and vice versa. Thus the displacement time characteristics of the clamps 27 and 28 is represented by a curve 37 and that of the clamps 29 and 30 by a curve 38. As previously described in connection with Fig. 6, the point A on the ordinate of Fig. 7 represents minimum clamp separation, and the point C the maximum clamp separation. It will thus be noted that when the clamps 27 and 28 are at maximum separation (curve 37), the clamps 29 and 30 are at minimum separation (curve 38). Thusly, the cam arrangement of Figs. 5 and 7 is referred to as being a "180 degrees out of phase" relationship. It will now be obvious to one skilled in the art that the results of the cam arrangement of Fig. 5 could, if desired, be achieved by modification of the equipment to utilize but a single cam.

As previously described, a third cam arrangement can be effected by rotating cam 24 of Fig. 5 one keyway angularly. The graphical result of such an arrangement is shown in Fig. 8, with the curves 39 and 40 representing the displacement-time characteristic of the clamps 27 and 28 and the clamps 29 and 39 respectively with the relationship therebetween being 90 degrees out of phase.

With the operation and construction of the apparatus now described, various modifications thereto will be apparent to one skilled in the art. Multiaxial stresses may be obtained by the provision of additional clamps and associated rods and cams acting along other axes. Thus, for example, the use of three clamps and associated rods placed at 60 degree included angles therebetween and actuated by three cams would cause a triaxial stress within the test specimen. Multiaxial stresses may be effected by the addition of further clamps and actuating equipment therefor. The curve of the cam can be varied to provide any desired shape of the curves of Figs. 6, 7 and 8. For example, saw-tooth, square-shaped, linear, and non-linear curves and combinations thereof may be generated by the provision of appropriately designed cams. Furthermore the keyways 34 heretofore described may be replaced by set screws to provide an infinite range of phase relationships.

If desired, a counter mechanism 41 may be provided as shown in Fig. 1, suitably mounted on the table 4 by a bracket 42. The counter 41 is actuated by a finger 43 contacting the crosslink 26 to provide an accurate count of the number of cycles to which the specimen is subjected.

Heaters or coolers (not shown) may be mounted adjacent the specimen 35 to provide means for testing at various temperatures if so desired.

While certain representative embodiments and details have been shown for the purpose of illustrating the invention, it will be apparent to those skilled in this art that various changes and modifications may be made therein without departing from the spirit or scope of the invention.

We claim:
1. An apparatus for testing a sheet specimen of an elastomer comprising a first and a second specimen-gripping means in spaced oppositely-fixed relationship along a first axis, a third and a fourth specimen-gripping means in spaced oppositely-fixed relationship along a second axis substantially normal to the first axis, said first and second axes being in the plane of the sheet specimen, means to reciprocatingly displace in cyclic manner the first and second gripping means linearly toward and from each other along the first axis, means to reciprocatingly displace in cyclic manner the third and fourth gripping means linearly toward and from each other along the second axis, and adjustable means to selectively vary the phase relationship between the cyclic movement along the first axis with that along the second axis to effect biaxial stresses within the test specimen.

2. An apparatus for testing a sheet specimen of an elastomer comprising a first and a second specimen-gripping means in spaced oppositely-fixed relationship along a first axis, a third and a fourth specimen-gripping means in spaced oppositely-fixed relationship along a second axis substantially normal to the first axis, said first and second axes being in the plane of the sheet specimen, a supporting structure, a shaft journaled on the supporting structure and having the longitudinal axis thereof substantially normal to both said first and second axes, a first and a second cam mounted on said shaft, connecting means between the first and second gripping means and the first cam and the third and fourth gripping means and the second cam respectively to reciprocatingly displace in cyclic manner the first and second gripping means linearly toward and from each other along the first axis and the second and third gripping means linearly toward and from each other along the second axis, said movements along the first and second axes being in a selected phase relationship collectively to effect biaxial stresses within the test specimen, and driving means engaging said shaft.

3. An apparatus for testing a sheet specimen of an elastomer comprising a first and a second specimen-gripping means in spaced oppositely-fixed relationship along a first axis, a third and a fourth specimen-gripping means in spaced oppositely-fixed relationship along a second axis substantially normal to the first axis, said first and second axes being in the plane of the sheet specimen, a supporting structure, a shaft journaled on the supporting structure and having the longitudinal axis thereof substantially normal to both said first and second axes, a first and a second cam mounted on said shaft, connecting means between the first and second gripping means and the first cam and the third and fourth gripping means and the second cam respectively to reciprocatingly displace in cyclic manner the first and second gripping means linearly toward and from each other along the first axis and the second and third gripping means linearly toward and from each other along the second axis, adjustable means to selectively vary the phase relationship between the cyclic movement along the first axis with that along the second axis to effect biaxial stresses within the test specimen, and driving means engaging said shaft.

References Cited in the file of this patent
UNITED STATES PATENTS

| | | |
|---|---|---|
| 1,505,127 | Ayres | Aug. 19, 1924 |
| 2,157,092 | Allen et al. | May 9, 1939 |
| 2,709,915 | Conti | June 7, 1955 |

FOREIGN PATENTS

| | | |
|---|---|---|
| 533,535 | France | Dec. 15, 1921 |